United States Patent
Kajiya et al.

(10) Patent No.: US 12,290,992 B2
(45) Date of Patent: May 6, 2025

(54) LAMINATE, METHOD OF FORMING OPTICAL BODY, AND CAMERA MODULE-MOUNTED DEVICE

(71) Applicant: Dexerials Corporation, Tokyo (JP)

(72) Inventors: Shunichi Kajiya, Tagajo (JP); Hiroshi Sugata, Tagajo (JP)

(73) Assignee: Dexerials Corporation, Tokyo (JP)

( * ) Notice: Subject to any disclaimer, the term of this patent is extended or adjusted under 35 U.S.C. 154(b) by 689 days.

(21) Appl. No.: 16/626,447

(22) PCT Filed: Jun. 29, 2018

(86) PCT No.: PCT/JP2018/024815
§ 371 (c)(1),
(2) Date: Dec. 24, 2019

(87) PCT Pub. No.: WO2019/009200
PCT Pub. Date: Jan. 10, 2019

(65) Prior Publication Data
US 2020/0223150 A1 Jul. 16, 2020

(30) Foreign Application Priority Data
Jul. 3, 2017 (JP) ................................. 2017-130537

(51) Int. Cl.
*B32B 3/30* (2006.01)
*B29C 59/02* (2006.01)
(Continued)

(52) U.S. Cl.
CPC .............. *B29C 65/48* (2013.01); *B29C 59/02* (2013.01); *B32B 3/30* (2013.01); *B32B 7/023* (2019.01); *G02B 1/118* (2013.01)

(58) Field of Classification Search
CPC .. B32B 3/30; B32B 7/023; B32B 7/06; B32B 7/12; B32B 7/04; B32B 7/05; G02B 1/118
See application file for complete search history.

(56) References Cited

U.S. PATENT DOCUMENTS

2016/0288450 A1\* 10/2016 Schwartz ................ B32B 27/08
2017/0348943 A1\* 12/2017 Kajiya .................. G03F 7/0002

FOREIGN PATENT DOCUMENTS

| JP | 2007009133 A | 1/2007 |
| JP | 2015216187 A | 12/2015 |

(Continued)

OTHER PUBLICATIONS

Translation to English for JP 2016-122163 A via espacenet. accessed Apr. 25, 2022 (Year: 2016).\*
(Continued)

*Primary Examiner* — Zachary M Davis
(74) *Attorney, Agent, or Firm* — KENJA IP LAW PC

(57) ABSTRACT

Provided is a laminate that includes a thin-film structure having a fine concave-convex structure at its surface, can be distributed on the market so that the thin-film structure is usable by a customer without staining or fracturing, and can be prevented from degradation even after storage. A laminate comprises a thin-film structure and holding films, wherein a first holding film is laminated on one surface of the thin-film structure and a second holding film is laminated on the other surface of the thin-film structure, the thin-film structure has fine concave-convex structures at both surfaces, and 0<P1, 0<P2, and P1≠P2, where P1 is a peel force at an interface between the first holding film and the thin-film structure and P2 is a peel force at an interface between the second holding film and the thin-film structure.

8 Claims, 7 Drawing Sheets

(51) Int. Cl.
  *B29C 65/48* (2006.01)
  *B32B 7/023* (2019.01)
  *G02B 1/118* (2015.01)

(56) References Cited

FOREIGN PATENT DOCUMENTS

| | | |
|---|---|---|
| JP | 2016122163 A | 7/2016 |
| JP | 2016210150 A | 12/2016 |
| TW | 201624017 A | 7/2016 |
| WO | 2013099798 A1 | 7/2013 |
| WO | 2014065136 A1 | 5/2014 |
| WO | 2016103980 A1 | 6/2016 |

OTHER PUBLICATIONS

Translation to English for JP2016-210150 A via espacenet. accessed Jul. 22, 2022. (Year: 2016).*

Apr. 7, 2022, Office Action issued by the Taiwan Intellectual Property Office in the corresponding Taiwanese Patent Application No. 107122910.

Jan. 9, 2020, International Preliminary Report on Patentability issued in the International Patent Application No. PCT/JP2018/024815.

Feb. 8, 2022, Notification of Reasons for Refusal issued by the Japan Patent Office in the corresponding Japanese Patent Application No. 2018-125245.

Jul. 8, 2021, Office Action issued by the China National Intellectual Property Administration in the corresponding Chinese Patent Application No. 201880043341.3.

Sep. 11, 2018, International Search Report issued in the International Patent Application No. PCT/JP2018/024815.

Oct. 8, 2022, Office Action issued by the Korean Intellectual Property Office in the corresponding Korean Patent Application No. 10-2019-7038403.

* cited by examiner

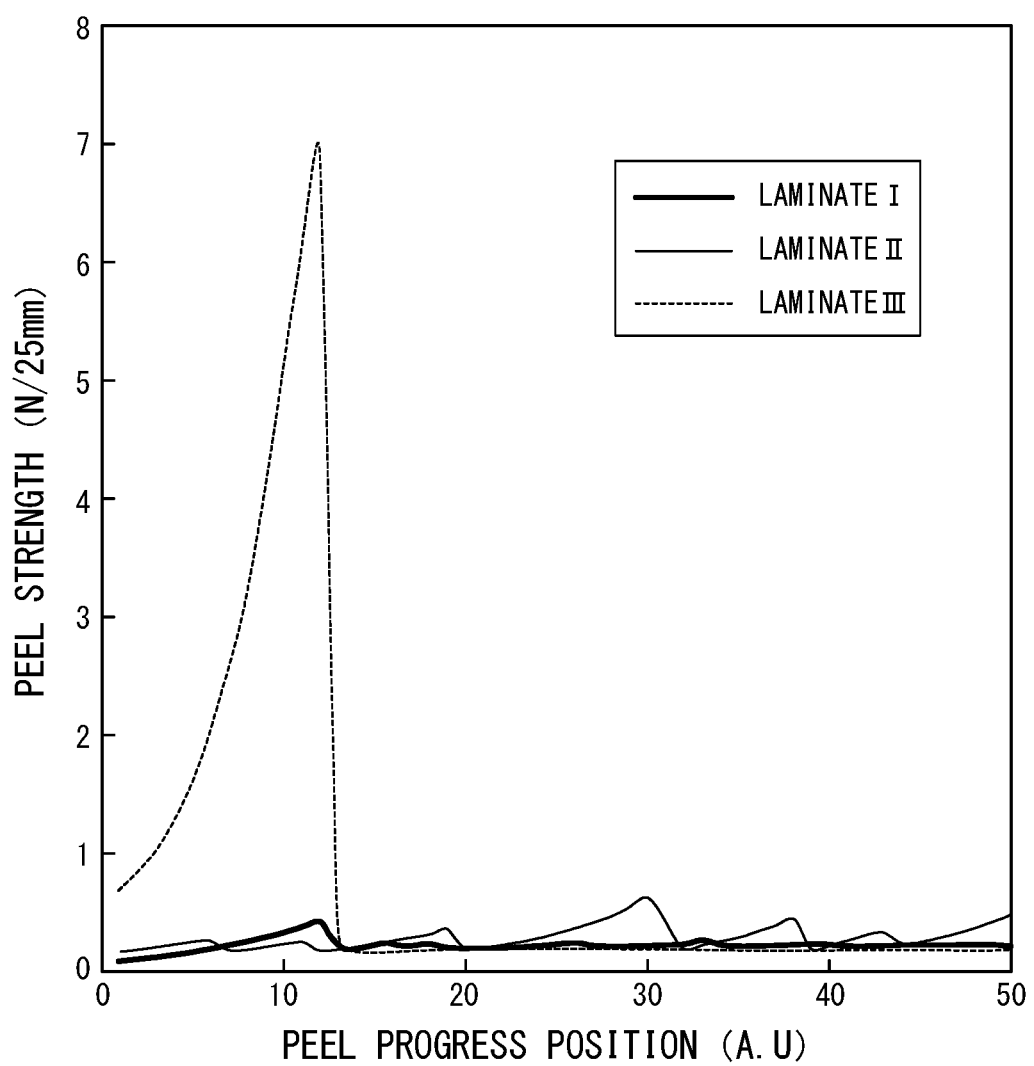

LAMINATE, METHOD OF FORMING OPTICAL BODY, AND CAMERA MODULE-MOUNTED DEVICE

TECHNICAL FIELD

The present disclosure relates to a laminate, a method of forming an optical body, and a camera module-mounted device.

BACKGROUND

In display devices such as liquid crystal displays and optical devices such as cameras, a light incidence surface of a substrate such as a display plate or a lens tends to be subjected to antireflection treatment in order to prevent degradation in visibility and image quality (occurrence of color unevenness, ghosts, etc.) caused by reflection of external light. A conventionally known antireflection treatment method forms a fine concave-convex structure at the light incidence surface to reduce reflectivity.

For example, PTL 1 discloses the following technique: In a solid-state imaging device that forms an image by photoelectric conversion of light incident on a semiconductor substrate, a fine concave-convex structure is formed at a light incidence surface of the semiconductor substrate, and an antireflection coating of a predetermined thickness is formed on the fine concave-convex structure, thus preventing light reflection on the light incidence surface.

The fine concave-convex structure can be formed at the light incidence surface by, for example, attaching a membrane having the fine concave-convex structure at its surface to the incidence surface. This method is very useful for reasons such as: the substrate need not be worked on; the membrane itself can be distributed on the market (i.e. the membrane is portable); and partial formation of the fine concave-convex structure in a desired region of the substrate surface is possible.

Particularly for the distribution on the market, it is important that the surface of the membrane having the fine concave-convex structure is reliably protected by a protective film in order to prevent adhesion of dirt to the surface of the fine concave-convex structure and maintain the shape of the fine concave-convex structure. It is also important that, when peeling the protective film, stain and fracture of the fine concave-convex structure are sufficiently prevented.

To address these issues, for example, PTL 2 discloses the following technique: In a laminate structure including an article having a fine concave-convex structure at its surface and an adhesive film in contact with the fine concave-convex structure-side surface of the article, the low-speed peel force and high-speed peel force of the adhesive film measured in accordance with JIS Z 0237: 2009 are optimized to enable intentional peeling of the adhesive film while preventing unintentional peeling and to reduce adhesive residue on the fine concave-convex structure.

CITATION LIST

Patent Literatures

PTL 1: JP 2015-216187 A
PTL 2: WO 2013/099798 A1

SUMMARY

Technical Problem

However, the technique disclosed in PTL 2 has the following problem: Since the film is attached to the fine concave-convex structure using adhesive material, when peeling the film, the fine concave-convex structure and consequently the article itself may fracture, even if adhesive residue on the fine concave-convex structure can be reduced. This problem is particularly evident in the case where the article having the fine concave-convex structure at its surface is very thin (e.g. 10 μm or less).

In recent years, membranes having fine concave-convex structures at not only one surface but both surfaces have been developed for the purpose of enhancing the antireflection effect. The technique disclosed in PTL 2 is predicated on attachment and peeling of a film to and from an article having a fine concave-convex structure only at one surface, and accordingly cannot be readily applied to a membrane having fine concave-convex structures at both surfaces.

It could therefore be helpful to provide a laminate that includes a thin-film structure having a fine concave-convex structure at its surface, can be distributed on the market so that the thin-film structure is usable by a customer without staining or fracturing, and can be prevented from degradation even after storage. It could also be helpful to provide a method of forming an optical body with excellent antireflection performance on a substrate using the laminate. It could further be helpful to provide a camera module-mounted device capable of obtaining a captured image without color unevenness, ghosts, and the like.

Solution to Problem

We thus provide:

<1> A laminate comprising: a thin-film structure; and holding films, wherein a first holding film is laminated on one surface of the thin-film structure, and a second holding film is laminated on an other surface of the thin-film structure, the thin-film structure has a first fine concave-convex structure at a surface in contact with the first holding film, and a second fine concave-convex structure at a surface in contact with the second holding film, the first holding film has a third fine concave-convex structure at a surface in contact with the thin-film structure, the second holding film has a fourth fine concave-convex structure at a surface in contact with the thin-film structure, and 0<P1, 0<P2, and P1≠P2 in a 90° peeling test in accordance with JIS Z 0237: 2009, where P1 is a peel force, expressed in N/25 mm, at an interface between the first holding film and the thin-film structure, and P2 is a peel force, expressed in N/25 mm, at an interface between the second holding film and the thin-film structure.

<2> The laminate according to <1>, wherein the third fine concave-convex structure is an inverse structure of the first fine concave-convex structure, and the fourth fine concave-convex structure is an inverse structure of the second fine concave-convex structure.

<3> The laminate according to <1> or <2>, wherein a thickness of the thin-film structure is 10 μm or less.

<4> The laminate according to any of <1> to <3>, wherein a thickness of a part of the thin-film structure without any fine concave-convex structure is 200 nm or less.

<5> The laminate according to any of <1> to <4>, wherein a peel force at peeling start is 2 N/25 mm or less in a 90° peeling test that: is conducted after peeling the second holding film from the laminate to obtain a one-side peeled laminate, pressing the one-side peeled laminate against an adhesive containing a UV curable acrylic resin or a UV curable epoxy resin and applied onto a substrate whose surface is made of a cycloolefin copolymer (COC), a cycloolefin polymer (COP), or an epoxy acrylate copolymer in a state in which a surface from which the second holding film has been peeled faces the substrate, and irradiating the adhesive with UV light to cure the adhesive; and peels a part of the thin-film structure fixed by the cured adhesive from the one-side peeled laminate while separating the part fixed by the cured adhesive from a part of the thin-film structure other than the part fixed by the cured adhesive.

<6> The laminate according to any of <1> to <5>, wherein the thin-film structure is composed of a single member.

<7> The laminate according to any of <1> to <6>, wherein the first fine concave-convex structure, the second fine concave-convex structure, the third fine concave-convex structure, and the fourth fine concave-convex structure each have a concave-convex pattern having a pitch of less than or equal to visible light wavelength.

<8> The laminate according to any of <1> to <7>, wherein P1'/P1≤1.5 and P2'/P2≤1.5, where P1' is a peel force, expressed in N/25 mm, at the interface between the first holding film and the thin-film structure after the laminate is left at 60° C. for 12 hours, and P2' is a peel force, expressed in N/25 mm, at the interface between the second holding film and the thin-film structure after the laminate is left at 60° C. for 12 hours.

<9> The laminate according to any of <1> to <8>, wherein at least one of the first holding film or the second holding film includes an inorganic membrane at a surface laminated on the thin-film structure.

<10> The laminate according to any of <1> to <9>, wherein at least one of the first holding film or the second holding film includes a peel membrane at a surface laminated on the thin-film structure.

<11> The laminate according to any of <1> to <10>, wherein the first holding film and the second holding film differ in thickness.

<12> A method of forming an optical body on a substrate, the method comprising: peeling the first holding film and the second holding film from the laminate according to any of <1> to <10>; and laminating the thin-film structure on the substrate with an adhesive therebetween.

<13> The method of forming an optical body on a substrate according to <12>, comprising: peeling the second holding film from the laminate to obtain a one-side peeled laminate; applying the adhesive onto the substrate; pressing the one-side peeled laminate against the applied adhesive in a state in which a surface from which the second holding film has been peeled faces the substrate; irradiating the pressed adhesive with UV light to cure the adhesive; and releasing press of the one-side peeled laminate and peeling the thin-film structure from the one-side peeled laminate to form, on the substrate, the optical body including the cured adhesive and the thin-film structure having approximately a same size as the adhesive.

<14> A camera module-mounted device comprising: a camera module; and a display plate, wherein the display plate includes an adhesive layer laminated on at least part of a surface thereof, and a thin-film structure laminated on the adhesive layer, the thin-film structure has fine concave-convex structures at both surfaces, and the camera module is set facing the thin-film structure.

Advantageous Effect

It is thus possible to provide a laminate that includes a thin-film structure having a fine concave-convex structure at its surface, can be distributed on the market so that the thin-film structure is usable by a customer without staining or fracturing, and can be prevented from degradation even after storage. It is also possible to provide a method of forming an optical body with excellent antireflection performance on a substrate using the laminate. It is further possible to provide a camera module-mounted device capable of obtaining a captured image without color unevenness, ghosts, and the like.

BRIEF DESCRIPTION OF THE DRAWINGS

In the accompanying drawings:

FIG. 8 is a diagram illustrating measurement results of peel force at peeling start when forming an optical body on a hardly-adhesive substrate using the laminate according to one of the disclosed embodiments.

DETAILED DESCRIPTION

One of the disclosed embodiments will be described in detail below.

(Laminate)

A laminate according to the present disclosure comprises: a thin-film structure; and holding films, wherein a first holding film is laminated on one surface of the thin-film structure, and a second holding film is laminated on an other surface of the thin-film structure, the thin-film structure has a first fine concave-convex structure at a surface in contact with the first holding film, and a second fine concave-convex structure at a surface in contact with the second holding film, the first holding film has a third fine concave-convex structure at a surface in contact with the thin-film structure, the second holding film has a fourth fine concave-convex structure at a surface in contact with the thin-film structure, and 0<P1, 0<P2, and P1≠P2 in a 90° peeling test in accordance with JIS Z 0237: 2009, where P1 is a peel force, expressed in N/25 mm, at an interface between the first holding film and the thin-film structure, and P2 is a peel force, expressed in N/25 mm, at an interface between the second holding film and the thin-film structure.

The laminate according to the present disclosure is regarded as an intermediate product used when forming an optical body on a substrate (described later).

A laminate according to one of the disclosed embodiments (hereafter also referred to as a "laminate according to this embodiment") will be described below, with reference to FIG. 1, etc.

Figure 1:
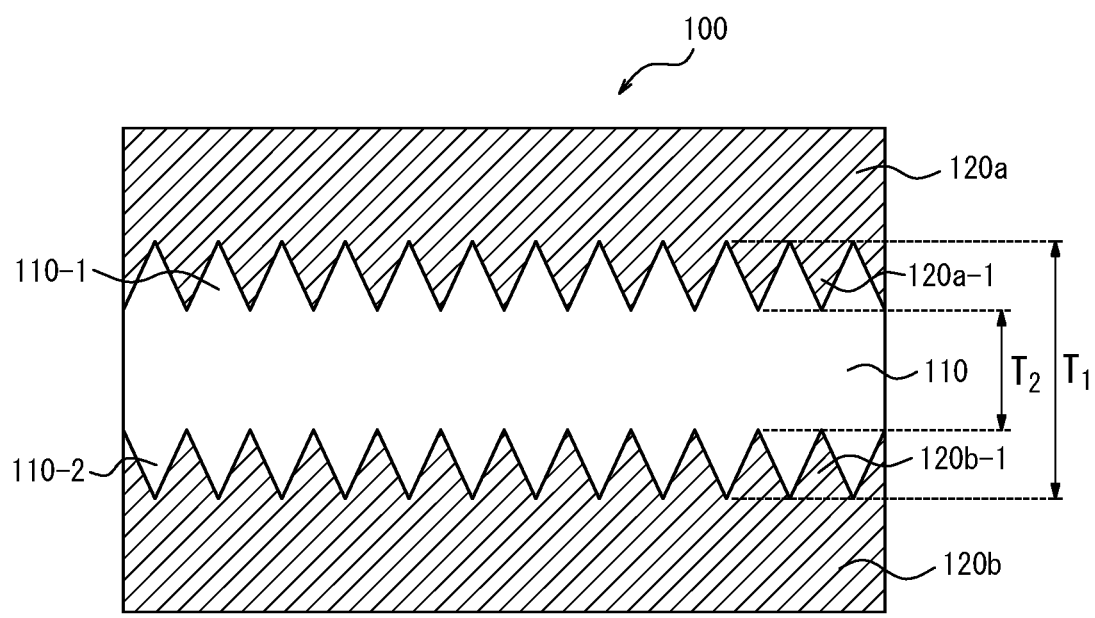
FIG. 1 is a schematic sectional diagram illustrating a laminate according to one of the disclosed embodiments.

As illustrated in FIG. 1, a laminate 100 according to this embodiment includes a thin-film structure 110 and two holding films, namely, a first holding film 120a and a second holding film 120b. The first holding film 120a is laminated on one surface of the thin-film structure 110, and the second holding film 120b is laminated on the other surface of the thin-film structure 110. Thus, the thin-film structure 110 is sandwiched between the two holding films. The thin-film structure 110 has a first fine concave-convex structure 110-1 at the surface on which the first holding film 120a is laminated, and a second fine concave-convex structure 110-2 at the surface on which the second holding film 120b is laminated. The first holding film 120a has a third fine concave-convex structure 120a-1, and the second holding film 120b has a fourth fine concave-convex structure 120b-1. The laminate according to this embodiment satisfies $0<P1$, $0<P2$, and $P1 \neq P2$ in a 90° peeling test in accordance with JIS Z 0237: 2009, where P1 (N/25 mm) is the peel force at the interface between the first holding film 120a and the thin-film structure 110, and P2 (N/25 mm) is the peel force at the interface between the second holding film 120b and the thin-film structure 110.

It is assumed that, of the two holding films sandwiching the thin-film structure 110 in the laminate according to this embodiment, the first holding film 120a has the greater peel force at the interface with the thin-film structure than the second holding film 120b, for the sake of convenience. That is, in the laminate according to this embodiment, $P1>P2$.

In the laminate according to this embodiment, the thin-film structure is sandwiched between the two holding films in a state of being in contact with their surfaces having the fine concave-convex structures (the third fine concave-convex structure and the fourth fine concave-convex structure), as described above. The fine concave-convex structures formed at both surfaces of the thin-film structure are thus protected. Therefore, the fine concave-convex structures are prevented from degradation when storing the laminate, and prevented from stain and fracture when distributing the laminate on the market.

Moreover, in the laminate according to this embodiment, the peel force between one surface of the thin-film structure and the holding film laminated on the surface and the peel force between the other surface of the thin-film structure and the holding film laminated on the other surface are different, as described above. Hence, the holding film with the smaller peel force (second holding film) can be smoothly peeled from the thin-film structure, while maintaining the lamination state of the holding film with the greater peel force (first holding film) and the thin-film structure. When peeling each holding film, in particular when peeling the second holding film, fracture of the fine concave-convex structure is suppressed. In the case where the peel force between one surface of the thin-film structure and the holding film laminated on the surface and the peel force between the other surface of the thin-film structure and the holding film laminated on the other surface are the same, on the other hand, when peeling one of the two holding films, the thin-film structure may break at around the center, or a large part of the fine concave-convex structure may come off together with the holding film. This makes it impossible to maintain sufficient quality until a customer actually uses the thin-film structure.

After peeling the second holding film, the first holding film can be peeled smoothly by fixing the thin-film structure to a substrate or the like.

The peel force P1 at the interface between the first holding film and the thin-film structure and the peel force P2 at the interface between the second holding film and the thin-film structure in the laminate according to this embodiment are each more than 0 N/25 mm, and preferably 0.05 N/25 mm or more, and preferably 0.5 N/25 mm or less. If P1 and P2 are each 0.05 N/25 mm or more, the holding film can be prevented from coming off by itself due to an external factor or the like. If P1 and P2 are each 0.5 N/25 mm or less, fracture of the fine concave-convex structure of the thin-film structure when peeling the holding film can be suppressed more sufficiently.

In the measurement of the peel force at the interface between each holding film and the thin-film structure, in the case where almost the entire surface of the thin-film structure comes off together with the holding film, the peel force measurement value is regarded as not more than 0 N/25 mm, on the ground that the peeling subjected to the measurement has failed.

The difference (P1−P2) between the peel force P1 at the interface between the first holding film and the thin-film structure and the peel force P2 at the interface between the second holding film and the thin-film structure in the laminate according to this embodiment is not limited, but is preferably 0.03 N/25 mm or more, and preferably 0.3 N/25 mm or less. If P1−P2 is 0.03 N/25 mm or more, while smoothly peeling each holding film, in particular the second holding film, from the thin-film structure, fracture of the thin-film structure and the fine concave-convex structure at its surface can be suppressed more effectively. If P1−P2 is 0.3 N/25 mm or less, fracture of the thin-film structure and the fine concave-convex structure at its surface when peeling the first holding film from the thin-film structure can be suppressed more effectively.

The peel force at the interface between each holding film and the thin-film structure can be appropriately adjusted, for example, by operations such as changing the material of the thin-film structure, changing the fine concave-convex structure of the thin-film structure, changing the thickness of the part of the thin-film structure without any fine concave-convex structure (described later), adding an additive such as a fluorine-based additive to the material of the base substrate (described later) of the holding film, changing the thickness of the holding film, providing an inorganic membrane on the holding film, providing a peel membrane on the holding film, and changing the material or thickness of the inorganic membrane or the peel membrane. Accordingly, P1−P2 can be appropriately adjusted by freely combining these operations.

The laminate according to this embodiment preferably satisfies $P1'/P1 \leq 1.5$ and $P2'/P2 \leq 1.5$, where P1' (N/25 mm) is the peel force at the interface between the first holding film 120a and the thin-film structure 110 after the laminate is left at 60° C. for 12 hours, and P2' (N/25 mm) is the peel force at the interface between the second holding film 120b and the thin-film structure 110 after the laminate is left at 60° C. for 12 hours. If $P1'/P1 \leq 1.5$ and $P2'/P2 \leq 1.5$, fracture of the fine concave-convex structure when peeling the holding film can be further suppressed even in the case where the laminate is put in an adverse environment. From the same perspective, the laminate according to this embodiment more preferably satisfies P1'/P1≤1.2 and P2'/P2≤1.2.

In chemical joining using a typical adhesive or gluing agent, adhesiveness tends to increase as a result of heating or over time. In view of this, the laminate according to this embodiment preferably does not have an adhesive or a gluing agent between the thin-film structure and the holding film, in order to satisfy P1'/P1≤1.5 and P2'/P2≤1.5 as described above.

In this embodiment, the peel force at the peeling start is preferably 2 N/25 mm or less in a 90° peeling test that: is conducted after peeling the second holding film from the laminate to obtain a one-side peeled laminate, pressing the one-side peeled laminate against an adhesive containing a UV curable acrylic resin or a UV curable epoxy resin and applied onto a substrate (hardly-adhesive substrate) whose surface is made of a polymer such as a cycloolefin copolymer (COC), a cycloolefin polymer (COP), or an epoxy acrylate copolymer in a state in which the surface from which the second holding film has been peeled faces the substrate, and irradiating the adhesive with UV light to cure the adhesive; and peels the part of the thin-film structure fixed by the cured adhesive from the one-side peeled laminate while separating the part fixed by the cured adhesive from the part of the thin-film structure other than the part fixed by the cured adhesive. With the laminate having such property, for example, in the case of forming an optical body by the below-described method of forming an optical body on a substrate according to one of the disclosed embodiments, the thin-film structure fixed by the adhesive on the substrate can be peeled from the one-side peeled laminate more reliably, with it being possible to form the optical body with high accuracy.

The peel force at the peeling start can be appropriately adjusted, for example, by operations such as changing the material of the thin-film structure, changing the fine concave-convex structure of the thin-film structure, changing the thickness of the part of the thin-film structure without any fine concave-convex structure (described later), adding an additive such as a fluorine-based additive to the material of the base substrate (described later) of the holding film, changing the thickness of the holding film, providing an inorganic membrane on the holding film, providing a peel membrane on the holding film, and changing the material or thickness of the inorganic membrane or the peel membrane.

The adhesive may contain a monomer such as dimethylacrylamide (DMAA), tetrahydrofurfuryl acrylate (THFA), acryloyl morpholine (ACMO), hexanediol diacrylate (HDDA), or isobornyl acrylate (IBXA).

<Thin-Film Structure>

The thin-film structure 110 used in this embodiment has the first fine concave-convex structure 110-1 and the second fine concave-convex structure 110-2 at both surfaces. That is, a fine concave-convex pattern (convex portions projecting in the thickness direction of the laminate and concave portions recessed in the thickness direction of the laminate) is formed at each of the two surfaces of the thin-film structure 110. The convex portions and the concave portions may be regularly arranged (e.g. in a hound's-tooth check pattern or a rectangular lattice pattern), or randomly arranged. The shape of each of the convex portions and the concave portions is not limited, and may be shell shape, cone shape, pillar shape, needle shape, or the like. The shape of the concave portion denotes the shape defined by the inner wall of the concave portion.

The thin-film structure 110 may be produced, for example, using a UV curable resin. The UV curable resin is not limited, and examples include a UV curable acrylic resin and a UV curable epoxy resin.

The average cycle (pitch) of the concave-convex pattern of each of the first fine concave-convex structure 110-1 and the second fine concave-convex structure 110-2 is preferably less than or equal to visible light wavelength (e.g. 830 nm or less), more preferably 350 nm or less, and further preferably 280 nm or less, and is more preferably 100 nm or more, and further preferably 150 nm or more. As a result of the pitch of the concave-convex pattern at the surface of the thin-film structure 110 being less than or equal to visible light wavelength, that is, as a result of the surface of the thin-film structure 110 having a moth-eye structure, antireflection performance can be further improved.

The average cycle of the concave-convex pattern of the surface of the thin-film structure 110 is an arithmetic mean value of distances between adjacent convex portions and between adjacent concave portions. The concave-convex pattern can be observed, for example, using a scanning electron microscope (SEM) or a cross-sectional transmission electron microscope (cross-sectional TEM). As an example of the average cycle calculation method, a plurality of pairs of adjacent convex portions and a plurality of pairs of adjacent concave portions are selected, the distance between the convex portions forming each pair and the distance between the concave portions forming each pair are measured, and the measurement values are averaged.

The depth of the concave portion (the height of the convex portion) of the concave-convex pattern of each of the first fine concave-convex structure 110-1 and the second fine concave-convex structure 110-2 is not limited, but is preferably 150 nm or more and more preferably 190 nm or more, and is preferably 300 nm or less and more preferably 230 nm or less.

The first fine concave-convex structure 110-1 and the second fine concave-convex structure 110-2 of the thin-film structure 110 may be the same or different in the layout of the concave portions and the convex portions, the average cycle of the concave-convex pattern, the depth of the concave portion, etc.

The thickness of the thin-film structure used in this embodiment is preferably 10 μm or less, more preferably 4 μm or less, and further preferably 1 μm or less, and is preferably 0.1 μm or more. Such a thin-film structure is suitable for applications required to be thinner and also have better antireflection performance, such as an image sensor-equipped laptop PC, tablet PC, smartphone, and mobile phone.

Herein, the thickness of the thin-film structure is the distance between the vertex of the highest convex portion formed at one surface and the vertex of the highest convex portion formed at the other surface in the lamination direction or the film thickness direction, as indicated by $T_1$ in FIG. 1.

In the thin-film structure used in this embodiment, the thickness of the part without any fine concave-convex structure is preferably 200 nm or less. With the laminate having such a thin-film structure, for example, in the case of forming an optical body by the below-described method of forming an optical body on a substrate according to one of the disclosed embodiments, the thin-film structure fixed by the adhesive on the substrate can be peeled from the one-side peeled laminate more reliably, with it being possible to form the optical body with high accuracy. The thickness of the part of the thin-film structure without any fine concave-convex structure may be 0.01 nm or more, from a realistic standpoint.

Herein, the thickness of the part of the thin-film structure without any fine concave-convex structure is the distance between the vertex of the deepest concave portion formed at one surface and the vertex of the deepest concave portion formed at the other surface in the lamination direction or the film thickness direction, as indicated by $T_2$ in FIG. 1.

The thin-film structure 110 may be, for example, produced by preparing a base substrate and two fine concave-convex layers as separate members and forming the fine concave-convex layers on both surfaces of the base substrate. In terms of preventing degradation in optical properties, however, the thin-film structure 110 is preferably composed of a single member. The laminate 100 including the thin-film structure 110 composed of a single member can be produced, for example, by the below-described laminate production method.

<Holding Film>

In the laminate 100 according to this embodiment, two holding films, namely, the first holding film 120a and the second holding film 120b, sandwich the thin-film structure 110. The two holding films are provided for purposes such as protecting the thin-film structure 110 and improving handleability.

The first holding film 120a has the third fine concave-convex structure 120a-1 at its surface in contact with the thin-film structure 110, and the second holding film 120b has the fourth fine concave-convex structure 120b-1 at its surface in contact with the thin-film structure 110, as illustrated in FIG. 1. That is, a fine concave-convex pattern (convex portions projecting in the thickness direction of the laminate and concave portions recessed in the thickness direction of the laminate) is formed at the predetermined surface of each of the first holding film 120a and the second holding film 120b. Thus, the fine concave-convex structures can be formed at both surfaces of the thin-film structure 110 easily.

Preferably, the third fine concave-convex structure 120a-1 of the first holding film 120a is an inverse structure of the first fine concave-convex structure 110-1 of the thin-film structure 110, and the fourth fine concave-convex structure 120b-1 of the second holding film 120b is an inverse structure of the second fine concave-convex structure 110-2 of the thin-film structure 110, as illustrated in FIG. 1. Thus, the thin-film structure 110 and each of the holding films 120a and 120b can be mechanically joined by their fine concave-convex structures to enhance the protection of the fine concave-convex structures formed at both surfaces of the thin-film structure 110, and more effectively suppress fracture of the thin-film structure when peeling each holding film. From the same perspective, the thin-film structure 110 and each of the first holding film 120a and the second holding film 120b preferably have their fine concave-convex structures meshing with each other without a gap.

The average cycle (pitch) of the concave-convex pattern of each of the third fine concave-convex structure 120a-1 and the fourth fine concave-convex structure 120b-1 is preferably less than or equal to visible light wavelength (e.g. 830 nm or less), more preferably 350 nm or less, and further preferably 280 nm or less, and is more preferably 100 nm or more, and further preferably 150 nm or more, as with the first fine concave-convex structure 110-1 and the second fine concave-convex structure 110-2.

Figure 2:
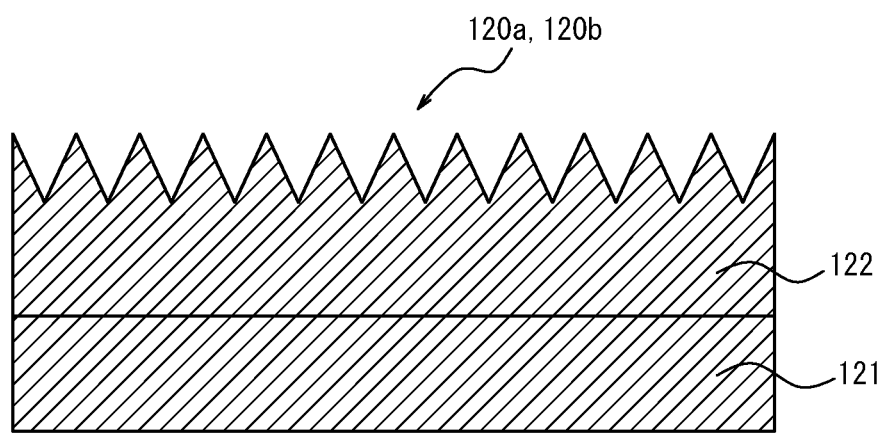
FIG. 2 is a schematic sectional diagram illustrating a holding film of the laminate according to one of the disclosed embodiments.

Each of the holding films 120a and 120b can be produced, for example, from a base substrate. Each of the holding films 120a and 120b having the fine concave-convex structure at its surface can be produced, for example, by forming a fine concave-convex layer 122 on a base substrate 121 as illustrated in FIG. 2.

The material of the base substrate is not limited, but is preferably transparent and hard to break. Examples include PET (polyethylene terephthalate) and TAC (triacetyl cellulose).

The fine concave-convex layer can be formed on the base substrate, for example, by a method including: a step of applying an uncured UV curable resin onto one surface of the base substrate; a step of bringing a roll on which the corresponding concave-convex pattern is formed into close contact with the applied UV curable resin to transfer the concave-convex pattern to the UV curable resin; a step of irradiating the applied UV curable resin with UV light to cure the UV curable resin; and a step of peeling the cured UV curable resin from the roll. The UV curable resin is not limited, and examples include a UV curable acrylic resin and a UV curable epoxy resin. Additives such as a curing initiator may be added to the UV curable resin according to need.

Figure 3:
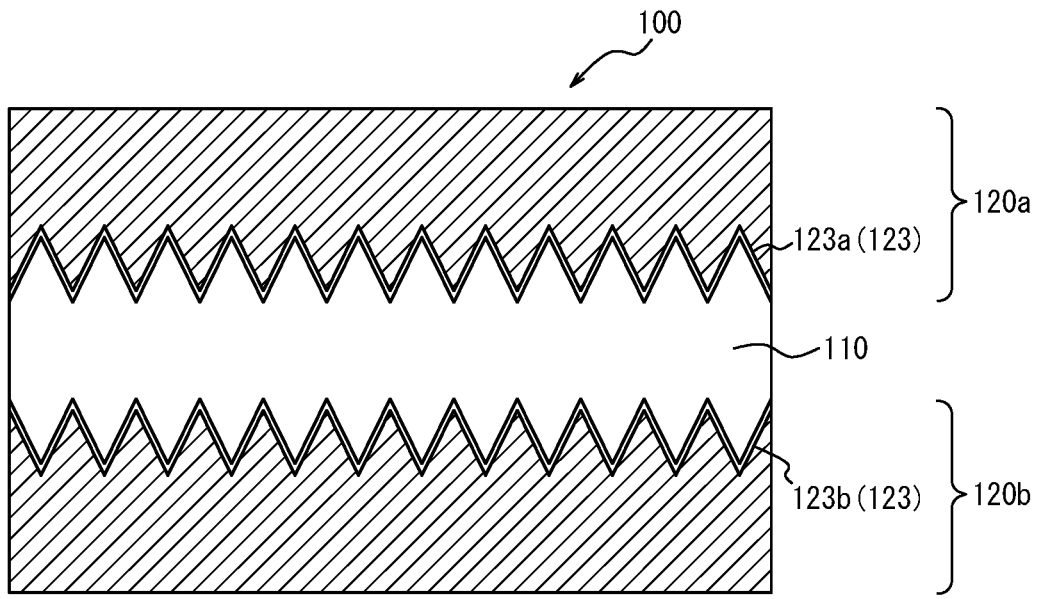
FIG. 3 is a schematic sectional diagram illustrating the laminate according to one of the disclosed embodiments.

In this embodiment, at least one of the first holding film 120a or the second holding film 120b (i.e. the first holding film 120a and/or the second holding film 120b) (both the first holding film 120a and the second holding film 120b in FIG. 3) preferably includes an inorganic membrane 123 at its surface laminated on the thin-film structure 110, as illustrated in FIG. 3. As a result of the holding film including the inorganic membrane 123, appropriate joining of the holding film to the thin-film structure 110 can be maintained, and, when peeling the holding film, fracture of the first fine concave-convex structure 110-1 or the second fine concave-convex structure 110-2 of the thin-film structure 110 can be suppressed more sufficiently. In addition, as a result of the holding film including the inorganic membrane 123, the below-described peel membrane can be easily formed thereon.

The material of the inorganic membrane 123 is not limited as long as it is an inorganic material. Examples include silicon; silicon dioxide; metal silicon; tungsten oxide; silicon nitride; ITO; transparent conductive materials other than ITO, such as ATO, AZO, and $SnO_2$; metals such as Al, Fe, Ti, and W; metal nitrides such as TiN, $WN_x$, and $AlN_x$; and insulating inorganic oxides such as $NbO_x$, $Al_2O_3$, and $TiO_2$. The thickness of the inorganic membrane 123 is not limited, but is preferably 5 nm to 50 nm, and more preferably 15 nm to 35 nm. Such an inorganic membrane 123 can be formed as one of the members constituting the holding film, for example, by sputtering using a sputter target.

In the case where both the first holding film 120a and the second holding film 120b include the inorganic membrane 123, the materials of the respective inorganic membranes 123 (123a and 123b) may be different, and the thicknesses of the respective inorganic membranes 123 (123a and 123b) may be different.

The surface of the inorganic membrane 123 may be subjected to activation treatment such as oxygen plasma treatment, without being limited thereto.

Figure 4:
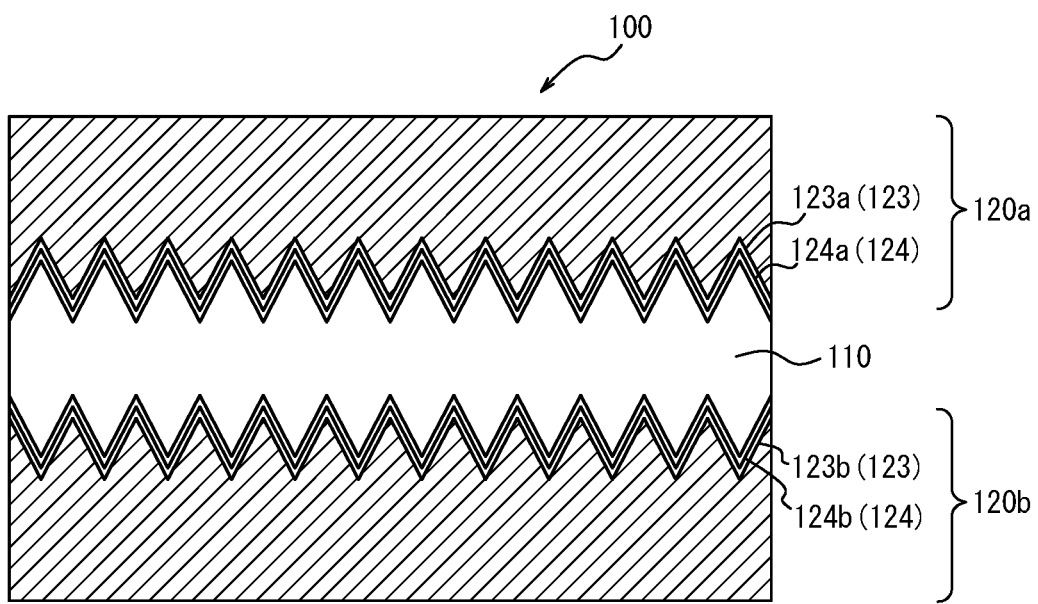
FIG. 4 is a schematic sectional diagram illustrating the laminate according to one of the disclosed embodiments.

In this embodiment, at least one of the first holding film 120a or the second holding film 120b (i.e. the first holding film 120a and/or the second holding film 120b) (both the first holding film 120a and the second holding film 120b in FIG. 4) preferably includes a peel membrane 124 at its surface laminated on the thin-film structure 110, as illustrated in FIG. 4. As a result of the holding film including the peel membrane 124, appropriate joining of the holding film to the thin-film structure 110 can be maintained, and, when peeling the holding film, fracture of the fine concave-convex structure 110-1 or 110-2 of the thin-film structure 110 can be suppressed more sufficiently. Although the peel membrane 124 is formed on the inorganic membrane 123 in FIG. 4, the peel membrane 124 may be formed directly on the base substrate 121 or the fine concave-convex layer 122 of the holding film.

The material of the peel membrane 124 is not limited, and may be, for example, a fluorine-based substance. Examples of commercial products that can be used include fluorine-based coating agent "Novec® 1720" (Novec is a registered trademark in Japan, other countries, or both) produced by 3M. The thickness of the peel membrane 124 is not limited, but is preferably 5 nm to 50 nm, and more preferably 5 nm to 20 nm. Such a peel membrane 124 can be formed as one of the members constituting the holding film, for example, by coating a liquid material.

The thin-film structure 110-side surface of the first holding film 120a and the thin-film structure 110-side surface of the second holding film 120b may have different membrane structures, to satisfy P1≠P2. Examples of variations of the membrane structures of the first holding film 120a and the second holding film 120b are listed in Table 1. These variations are, however, not limitations, and whether each membrane is present in the first holding film 120a and the second holding film 120b and the membrane structures of the first holding film 120a and the second holding film 120b may be changed freely in this embodiment.

<Laminate Production Method>

A method of producing the laminate according to this embodiment is not limited, and may be selected as appropriate depending on the purpose. An example of the method of producing the laminate will be described below, with reference to FIGS. 5A and 5B.

The exemplary method includes: a step of sandwiching a UV curable resin between two holding films each having a fine concave-convex structure at its surface and pressure joining them (sandwiching and pressure joining step); and a step of curing the sandwiched UV curable resin by irradiation with UV light (curing step).

—Sandwiching and Pressure Joining Step—

Figure 5A:
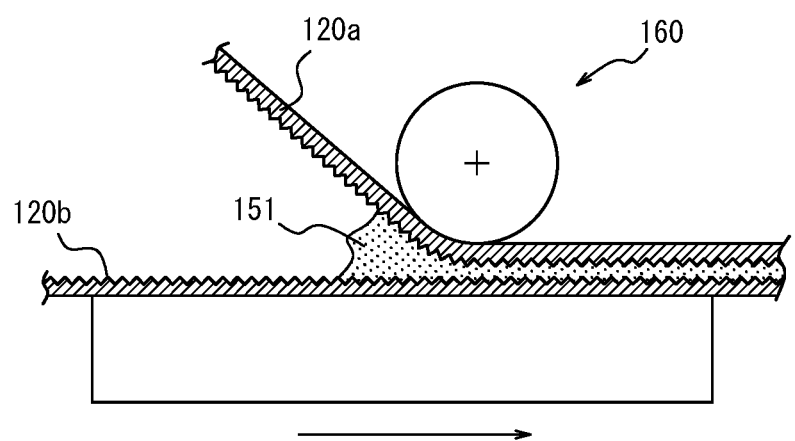
FIG. 5A is a schematic diagram illustrating a step in an exemplary method of producing the laminate according to one of the disclosed embodiments.

First, two holding films each having a fine concave-convex structure at its surface (i.e. the first holding film 120a having the third fine concave-convex structure at its surface and the second holding film 120b having the fourth fine concave-convex structure at its surface) are prepared. The first holding film 120a and the second holding film 120b are as described above. Next, a UV curable resin 151 is sandwiched between the first holding film 120a and the second holding film 120b in a state in which their fine concave-convex structures face each other, as illustrated in FIG. 5A. The UV curable resin is not limited, and examples include a UV curable acrylic resin and a UV curable epoxy resin. Additives such as a curing initiator may be added to the UV curable resin 151 according to need. A monomer such as an ethylene oxide-based (EO-based) acrylic monomer, a propylene oxide-based (PO-based) acrylic monomer, or a fluorene-based monomer may be added to the UV curable resin 151, in terms of enhancing peelability and shape retainability.

TABLE 1

| | First holding film (Higher peel force) | | Second holding film (Lower peel force) | |
|---|---|---|---|---|
| Variation | Material of inorganic membrane | Material of peel membrane | Material of inorganic membrane | Material of peel membrane |
| 1 | Metal silicon | Fluorine-based substance | ITO | Fluorine-based substance |
| 2 | Metal silicon | Fluorine-based substance | Transparent conductive material other than ITO | Fluorine-based substance |
| 3 | Metal silicon | Fluorine-based substance | Tungsten oxide | Fluorine-based substance |
| 4 | Silicon dioxide (SiO$_2$) | Fluorine-based substance | ITO | Fluorine-based substance |
| 5 | Silicon dioxide (SiO$_2$) | Fluorine-based substance | Silicon (Si) | Fluorine-based substance |
| 6 | Silicon dioxide (SiO$_2$) | Fluorine-based substance | Silicon (Si) | Fluorine-based substance |
| 7 | None | None | ITO | Fluorine-based substance |
| 8 | Insulating inorganic oxide | Fluorine-based substance | Metal | Fluorine-based substance |
| 9 | Insulating inorganic oxide | None | Metal | None |
| 10 | Insulating inorganic oxide | Fluorine-based substance | Metal nitride | Fluorine-based substance |
| 11 | Insulating inorganic oxide | None | Metal nitride | None |

In this embodiment, the thickness of the first holding film 120a and the thickness of the second holding film 120b are preferably different. This provides a difference between the peel force P1 at the interface between the first holding film 120a and the thin-film structure 110 and the peel force P2 at the interface between the second holding film 120b and the thin-film structure 110, and fracture of the first fine concave-convex structure 110-1 and the second fine concave-convex structure 110-2 when peeling the holding films can be suppressed more easily.

Herein, the thickness of each holding film is the height of the holding film to the vertex of the convex portion in the case where the holding film has the fine concave-convex structure at its surface. In the case where the holding film includes the inorganic membrane and/or the peel membrane, the thickness of the holding film is the thickness including the thickness of the membrane(s).

The viscosity of the UV curable resin 151 is preferably 30 cps or less. If the viscosity of the UV curable resin 151 is 30 cps or less, the thickness of the part without any fine concave-convex structure can be limited to 200 nm or less more easily in the formation of the thin-film structure.

The sandwich body is then pressure joined in the sandwiching direction by a pressure joining device such as a roll laminator 160, as illustrated in FIG. 5A. In the sandwiching and pressure joining step, the thickness of the resultant thin-film structure 110 ($T_1$ in FIG. 1) and the thickness of the part of the thin-film structure 110 without any fine concave-convex structure ($T_2$ in FIG. 1) can be adjusted by adjusting the pressure in the pressure joining. The thickness of the resultant thin-film structure 110 ($T_1$ in FIG. 1) and the thickness of the part of the thin-film structure 110 without any fine concave-convex structure ($T_2$ in FIG. 1) can also be adjusted by adjusting the feed speed by the roll laminator.

Although the second holding film 120b is located on the lower side and the first holding film 120a is located on the upper side with respect to the roll laminator 160 in FIG. 5A, their positional relationship is not limited.

—Curing Step—

Figure 5B:
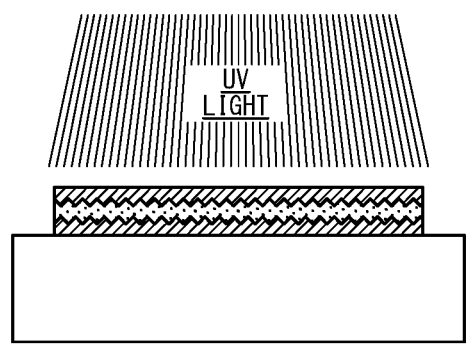
FIG. 5B is a schematic diagram illustrating a step in the exemplary method of producing the laminate according to one of the disclosed embodiments.

In the curing step, the sandwiched UV curable resin 151 is irradiated with UV light to cure the UV curable resin 151, as illustrated in FIG. 5B. As a result of the UV curable resin 151 being cured, the thin-film structure 110 having fine concave-convex structures at both surfaces is formed as a single member, and the laminate 100 is obtained, as illustrated in FIG. 1. The curing step may be performed simultaneously with the sandwiching and pressure joining step.

The resultant thin-film structure 110 has, at one surface, the fine concave-convex structure (first fine concave-convex structure) meshing with the third fine concave-convex structure 120a-1 of the first holding film 120a without a gap, and has, at the other surface, the fine concave-convex structure (second fine concave-convex structure) meshing with the fourth fine concave-convex structure 120b-1 of the second holding film 120b without a gap.

(Method of Forming Optical Body on Substrate)

A method of forming an optical body on a substrate according to the present disclosure comprises: peeling the first holding film and the second holding film from the above-described laminate according to the present disclosure; and laminating the thin-film structure on the substrate with an adhesive therebetween. With this method, the thin-film structure having fine concave-convex structures at both surfaces can be formed on a substrate as an optical body with excellent antireflection performance, without fracture. In particular, even in the case where the thin-film structure is very thin (e.g. 4 μm or less), fracture of the fine concave-convex structures in the formation of the optical body is significantly suppressed.

A method of forming an optical body on a substrate according to one of the disclosed embodiments (hereafter also referred to as a "formation method according to this embodiment") will be described below, with reference to FIGS. 6A to 6E.

FIGS. 6A to 6E are schematic diagrams illustrating the formation method according to this embodiment. The formation method according to this embodiment includes a first peeling step, an application step, a pressing step, a curing step, and a second peeling step.

Figure 6A:
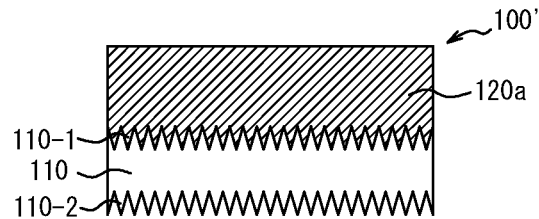
FIG. 6A is a schematic diagram illustrating a step in a method of forming an optical body on a substrate according to one of the disclosed embodiments.

In the first peeling step, the second holding film 120b is peeled from the laminate 100 illustrated in FIG. 1 (or FIG. 3 or 4), to obtain the state illustrated in FIG. 6A (one-side peeled laminate 100'). Since P2 (the peel force at the interface between the second holding film 120b and the thin-film structure 110) is less than P1 (the peel force at the interface between the first holding film 120a and the thin-film structure 110), the second holding film 120b can be peeled smoothly while maintaining the lamination state of the first holding film 120a and the thin-film structure 110, without fracture of the fine concave-convex structure 110-2.

Moreover, peeling the second holding film 120b while bending the laminate enables smooth peeling.

Figure 6B:
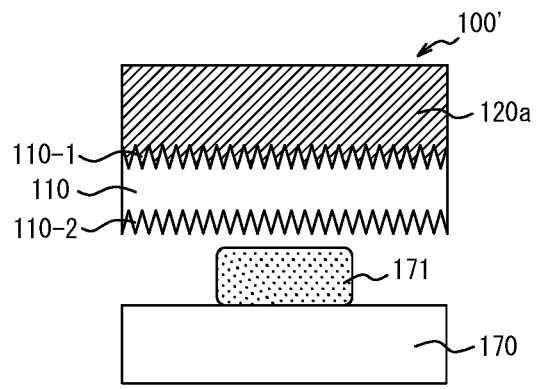
FIG. 6B is a schematic diagram illustrating a step in the method of forming an optical body on a substrate according to one of the disclosed embodiments.

In the application step illustrated in FIG. 6B after the first peeling step, an adhesive 171 is applied onto a substrate 170. The adhesive 171 is not limited, and is, for example, a composition containing a UV curable resin such as a UV curable acrylic resin or a UV curable epoxy resin. The material of the substrate 170 is not limited, and may be selected as appropriate depending on the purpose of forming an optical body. Examples include glass, glass coated with any organic material such as epoxy acrylate copolymer or the like, polymethyl methacrylate (PMMA), cycloolefin copolymer (COC), and cycloolefin polymer (COP).

Figure 6C:
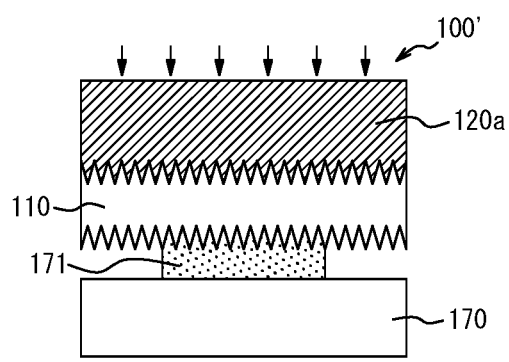
FIG. 6C is a schematic diagram illustrating a step in the method of forming an optical body on a substrate according to one of the disclosed embodiments.

In the pressing step illustrated in FIG. 6C after the application step, the one-side peeled laminate 100' is pressed against the adhesive 171 applied onto the substrate 170 in a state in which the surface from which the second holding film 120b has been peeled faces the substrate 170. The pressed adhesive 171 is spread between the substrate 170 and the thin-film structure 110.

Figure 6D:
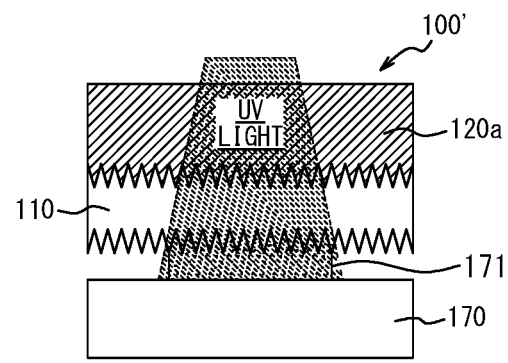
FIG. 6D is a schematic diagram illustrating a step in the method of forming an optical body on a substrate according to one of the disclosed embodiments.

In the curing step illustrated in FIG. 6D, the pressed adhesive 171 is irradiated with UV light while maintaining the press, to cure the adhesive 171. The cured adhesive 171 firmly adheres to the substrate 170 and the thin-film structure 110.

The curing step may be performed simultaneously with the pressing step.

Figure 6E:
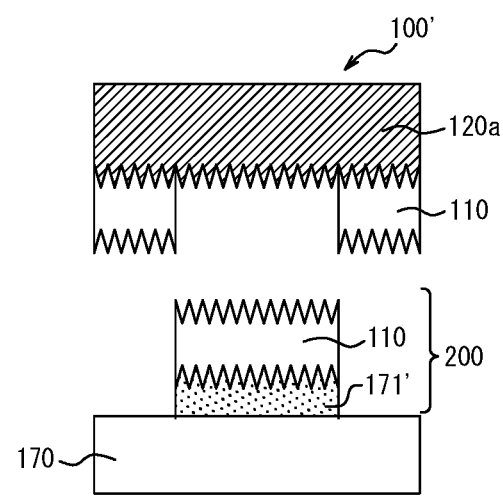
FIG. 6E is a schematic diagram illustrating a step in the method of forming an optical body on a substrate according to one of the disclosed embodiments.

In the second peeling step illustrated in FIG. 6E, the press of the one-side peeled laminate 100' is released to release the one-side peeled laminate 100' from the substrate 170, thus peeling the thin-film structure 110 from the one-side peeled laminate 100'. As a result of the curing step, in the region of the thin-film structure 110 of the one-side peeled laminate 100' in which the adhesive 171 is present and that is irradiated with UV light, the thin-film structure 110 and the substrate 170 are fixed to each other by the cured adhesive 171'. By releasing the one-side peeled laminate 100', the part of the thin-film structure 110 fixed by the cured adhesive 171' is peeled from the one-side peeled laminate 100' (first holding film 120a) while being separated (divided) from the part of the thin-film structure 110 on the first holding film 120a other than the part fixed by the cured adhesive 171'. Consequently, an optical body 200 including the cured adhesive 171' and the thin-film structure 110 having approximately the same size as the adhesive 171' is formed on the substrate 170. With this method, the thin-film structure 110 (or the optical body 200) can be formed in a desired region of the substrate surface partly and with high accuracy. This method is particularly advantageous because the thin-film structure 110 (or the optical body 200) can be formed even on a hardly-adhesive substrate (e.g. a substrate made of a polymer such as cycloolefin copolymer (COC), cycloolefin polymer (COP), or epoxy acrylate copolymer) partly and with high accuracy.

As illustrated in FIG. 6E, in the optical body 200 formed on the substrate 170, the cured adhesive 171' can enter into the concave portions on the substrate 170-side surface of the thin-film structure 110. In other words, the cured adhesive 171' can have a fine concave-convex structure at the thin-film structure 110-side surface. Such an optical body 200 has excellent antireflection performance. For example, the optical body 200 has an average reflectivity of 1% or less in a wavelength range of 400 nm to 750 nm.

(Camera Module-Mounted Device)

A camera module-mounted device according to the present disclosure comprises: a camera module; and a display plate, wherein the display plate includes an adhesive layer laminated on at least part of a surface thereof, and a thin-film structure laminated on the adhesive layer, the thin-film structure has fine concave-convex structures at both surfaces, and the camera module is set facing the thin-film structure. With this camera module-mounted device, a still image or a moving image can be captured by an image sensor of the camera module through the thin-film structure having fine concave-convex structures at both surfaces. Hence, light reflection is suppressed, and the captured image has no color unevenness, ghosts, and the like.

Specific examples of the camera module-mounted device include a laptop PC, a tablet PC, a smartphone, and a mobile phone.

A camera module-mounted device according to one of the disclosed embodiments (hereafter also referred to as a "device according to this embodiment") will be described below, with reference to FIG. 7.

Figure 7:
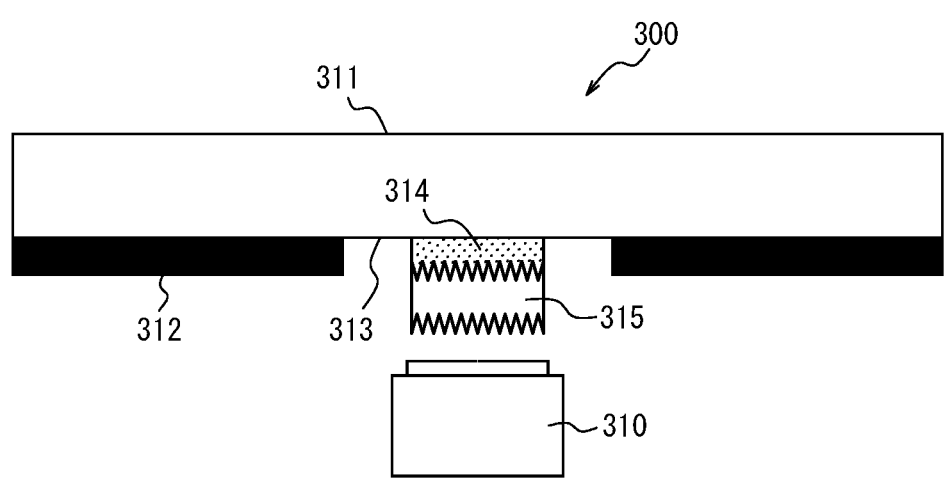
FIG. 7 is a schematic diagram illustrating the vicinity of a camera module in a camera module-mounted device according to one of the disclosed embodiments.

FIG. 7 is a schematic diagram illustrating the vicinity of a camera module in the camera module-mounted device according to this embodiment. As illustrated in FIG. 7, a camera module-mounted device 300 according to this embodiment includes a camera module 310 and a display plate 311. A shading region 312 and a transparent region (non-shading region) 313 are formed at one surface of the display plate 311. An adhesive layer 314 is laminated on the transparent region 313 of the display plate 311, and a thin-film structure 315 is laminated on the adhesive layer 314.

The display plate 311 is preferably transparent, as it is used as a liquid crystal display, a touch panel, or the like. For example, the display plate 311 is made of glass, glass coated with any organic material, or polymethyl methacrylate (PMMA). The thin-film structure 315 is as described above with regard to the thin-film structure of the laminate according to the present disclosure.

The adhesive layer 314 and the thin-film structure 315 can be formed on the display plate 311 as a substrate, using the foregoing laminate 100 according to the present disclosure by the foregoing method of forming an optical body on a substrate according to the present disclosure. In this case, the adhesive layer 314 and the thin-film structure 315 respectively correspond to the cured adhesive 171' and the thin-film structure 110 described with regard to the formation method according to this embodiment.

The camera module 310 is set facing the thin-film structure 315, as illustrated in FIG. 7.

The detailed conditions of the device according to this embodiment, such as the specific structure of the camera module 310 and the distance between the camera module 310 and the thin-film structure 315, are not limited.

EXAMPLES

More detailed description will be given below by way of examples and comparative examples, although the present disclosure is not limited to these examples.

For each of the laminates produced in examples and comparative examples, the following procedures were used to measure the peel force at the lamination interface and evaluate fracture of the thin-film structure.
(Measurement of Peel Force at Lamination Interface)

A 90° peeling test in accordance with JIS Z 0237: 2009 was conducted to measure the peel force at the interface between the holding film and the thin-film structure in the produced laminate, for each of holding films A and B. The measurement values for the holding films A and B were set as P1 (larger value) and P2 (smaller value) based on their magnitudes.

A laminate produced separately was left (stored) at 60° C. for 12 hours. Subsequently, a 90° peeling test in accordance with JIS Z 0237: 2009 was conducted to measure the peel force at the interface between the holding film and the thin-film structure in the laminate, for each of the holding films A and B.

When measuring the peel force at the interface between one holding film and the thin-film structure, the other holding film was fixed so as not to peel.

In the measurement of the peel force, in the case where almost the entire surface of the thin-film structure came off together with the holding film, the peeling subjected to the measurement was determined as a failure, and "unmeasurable" was set as the evaluation result.
(Evaluation of Fracture of Thin-Film Structure)

First, the holding film (second holding film) with the smaller peel force of the holding films A and B as a result of the foregoing measurement was peeled from the produced laminate, to obtain a one-side peeled laminate. Fracture of the thin-film structure at the time (on the second holding film side) was observed. In the case where the peel forces of the holding films A and B were the same, the holding film B was peeled and fracture of the thin-film structure was observed.

Next, a glass substrate was prepared, a UV curable resin was applied onto the glass substrate, and the one-side peeled laminate was pressed against the UV curable resin on the substrate in a state in which the exposed surface of the thin-film structure faced the UV curable resin. The UV curable resin was then irradiated with UV light at an irradiance of 1000 mJ/cm$^2$, to fix the thin-film structure and the glass substrate to each other. After this, the press was released, and the first holding film of the one-side peeled laminate was peeled from the fixed thin-film structure. Fracture of the thin-film structure at this time (on the first holding film side) was observed.

Based on the observation, fracture of the thin-film structure was evaluated according to the following criteria:
  A: Fracture of the thin-film structure (including fracture of the fine concave-convex structures) was not observed.
  B: Part of the surface of the thin-film structure came off together with the holding film.
  C: Almost the entire surface of the thin-film structure came off together with the holding film.
  D: The holding film did not adhere to the thin-film structure, and consequently stain occurred when handling the thin-film structure.

Example 1

<Production of Holding Film A>

A PET film ("A4300" produced by Toyobo Co., Ltd., thickness: 125 μm) was prepared as a base substrate of the holding film A, and a UV curable resin was applied onto one surface of the base substrate. A roll having a fine concave-convex pattern formed on its surface was brought into tight contact with the UV curable resin. The concave-convex pattern of the roll was transferred to the UV curable resin by a roll-to-roll method, and the UV curable resin was cured by irradiation with UV light to form a fine concave-convex layer on the base substrate. The fine concave-convex layer had a concave-convex pattern with a concave-convex pitch of 150 nm to 230 nm and a concave portion depth of approximately 200 nm.

A metal silicon layer with a thickness of 20 nm as an inorganic membrane was then formed on the surface of the fine concave-convex layer by sputtering. Subsequently, oxygen plasma treatment was performed, and then a peel membrane was formed thereon using a fluorine-based coating agent ("Novec® 1720" produced by 3M).

The holding film A including the base substrate, the fine concave-convex layer, the inorganic membrane, and the peel membrane was thus obtained.
<Production of Holding Film B>

The holding film B was produced in the same way as the holding film A, except that an indium tin oxide (ITO) layer with a thickness of 20 nm was formed by sputtering as the inorganic membrane instead of forming a metal silicon layer with a thickness of 20 nm by sputtering in the production of the holding film A.

The holding film B including the base substrate, the fine concave-convex layer, the inorganic membrane, and the peel membrane was thus obtained.

<Production of Laminate>

A UV curable resin was applied onto the surface of the produced holding film A on which the fine concave-convex layer had been formed, to coat the entire concave-convex surface of the peel membrane. The produced holding film B was laminated thereon in a state in which the surface on which the fine concave-convex layer had been formed faced the holding film A, and pressure joined using a roll laminator. "UVX6366" produced by Toagosei Co., Ltd. was used as the UV curable resin, and tetrahydrofurfuryl alcohol (THFA) and 1,6-hexanediol diacrylate (HDDA) were added to this UV curable resin each in a proportion of approximately 20% in mass to the UV curable resin. In the lamination state, UV light was applied at an irradiance of 1000 mJ/cm$^2$ to cure the UV curable resin and form a thin-film structure, thus obtaining a laminate. Both surfaces of the thin-film structure sandwiched between the two holding films meshed with the fine concave-convex layers of the respective holding films without a gap, and each had a concave-convex pattern (an inverse concave-convex pattern with a concave-convex pitch of 150 nm to 230 nm and a concave portion depth of approximately 200 nm) corresponding to the concave-convex pattern of the fine concave-convex layer of the corresponding holding film. A SEM image revealed that the thickness of the thin-film structure was approximately 1 μm and the thickness of the part of the thin-film structure without any fine concave-convex structure was 200 nm.

Example 2

A laminate was obtained in the same way as Example 1, except that a tungsten oxide layer with a thickness of 20 nm was formed by sputtering as the inorganic membrane in the holding film A instead of forming a metal silicon layer with a thickness of 20 nm by sputtering in Example 1. Both surfaces of the thin-film structure sandwiched between the two holding films meshed with the fine concave-convex layers of the respective holding films without a gap, and each had a concave-convex pattern (an inverse concave-convex pattern with a concave-convex pitch of 150 nm to 230 nm and a concave portion depth of approximately 200 nm) corresponding to the concave-convex pattern of the fine concave-convex layer of the corresponding holding film. The thickness of the thin-film structure was approximately 1 μm.

Comparative Example 1

<Production of Holding Film A>

The holding film A was produced in the same way as the holding film A in Example 1, except that a tungsten oxide layer with a thickness of 20 nm was formed by sputtering as the inorganic membrane instead of forming a metal silicon layer with a thickness of 20 nm by sputtering in the production of the holding film A in Example 1.

The holding film A including the base substrate, the fine concave-convex layer, the inorganic membrane, and the peel membrane was thus obtained.

<Production of Laminate>

A UV curable resin was applied onto the surface of the produced holding film A on which the fine concave-convex layer had been formed, to coat the entire concave-convex surface of the peel membrane. A mirror glass plate was laminated thereon, and pressure joined using a roll laminator. In the lamination state, UV light was applied at an irradiance of 1000 mJ/cm$^2$ to cure the UV curable resin and form a thin-film structure. After this, the mirror glass plate was peeled, and a holding film B having a flat surface ("PAC2-70-G" produced by Sun A. Kaken Co., Ltd.) was laminated onto the peeling surface using a laminator, thus obtaining a laminate. The holding film B-side surface of the thin-film structure had a flat structure, and the thickness of the thin-film structure was approximately 1 μm.

Comparative Example 2

A laminate was obtained in the same way as Comparative Example 1, except that "FSA-050M" produced by Futamura Chemical Co., Ltd. was used as the holding film B having a flat surface instead of "PAC2-70-G" produced by Sun A. Kaken Co., Ltd. in Comparative Example 1. The holding film B-side surface of the thin-film structure had a flat structure, and the thickness of the thin-film structure was approximately 1 μm.

Comparative Example 3

The same holding film A as the holding film A in Comparative Example 1 was obtained. A UV curable resin was then applied onto the surface of the holding film A on which the fine concave-convex layer had been formed, to coat the entire concave-convex surface of the peel membrane. Next, a master having a fine concave-convex pattern formed at its surface was pressure joined to the UV curable resin. In this state, UV light was applied at an irradiance of 1000 mJ/cm$^2$ to cure the UV curable resin and form a thin-film structure. After this, the thin-film structure was peeled from the master, and a holding film B having a flat surface ("PAC2-70-G" produced by Sun A. Kaken Co., Ltd.) was laminated onto the peeling surface using a laminator, thus obtaining a laminate. The concave-convex pattern of the master had a concave-convex pitch of 150 nm to 230 nm and a concave portion depth of approximately 200 nm. One surface of the thin-film structure meshed with the fine concave-convex layer of the holding film A without a gap, and had a concave-convex pattern corresponding to the concave-convex pattern of the fine concave-convex layer of the holding film A. The other surface of the thin-film structure had a concave-convex pattern corresponding to the concave-convex pattern of the master. The thickness of the thin-film structure was approximately 1 μm.

Comparative Example 4

A laminate was obtained in the same way as Comparative Example 3, except that "FSA-050M" produced by Futamura Chemical Co., Ltd. was used as the holding film B having a flat surface instead of "PAC2-70-G" produced by Sun A. Kaken Co., Ltd. in Comparative Example 3. One surface of the thin-film structure meshed with the fine concave-convex layer of the holding film A without a gap, and had a concave-convex pattern corresponding to the concave-convex pattern of the fine concave-convex layer of the holding film A. The other surface of the thin-film structure had a concave-convex pattern corresponding to the concave-convex pattern of the master. The thickness of the thin-film structure was approximately 1 μm.

Comparative Example 5

A laminate was obtained in the same way as Example 1, except that the same holding film as the holding film B in Example 1 was used as the holding film A. The thickness of the thin-film structure was approximately 1 µm.

TABLE 2

| | | | Example 1 | Example 2 | Comparative Example 1 | Comparative Example 2 | Comparative Example 3 | Comparative Example 4 | Comparative Example 5 |
|---|---|---|---|---|---|---|---|---|---|
| Location of fine concave-convex structure in thin-film structure | | | Both surfaces | Both surfaces | One surface only | One surface only | Both surfaces | Both surfaces | Both surfaces |
| Before leaving | Peel force between holding film A and thin-film structure [N/25 mm] | | 0.24 (P1) | 0.19 (P1) | 0.19 (P1) | 0.19 (P1) | 0.19 (P1) | 0.19 (P1) | 0.14 |
| | Peel force between holding film B and thin-film structure [N/25 mm] | | 0.14 (P2) | 0.14 (P2) | 0.05 (P2) | Unmeasurable (P2) | 0 (P2) | 0 (P2) | 0.14 |
| After leaving at 60° C. for 12 hours | Peel force between holding film A and thin-film structure [N/25 mm] | | 0.23 (P1') | 0.22 (P1') | 0.22 (P1') | 0.22 (P1') | 0.22 (P1') | 0.22 (P1') | — |
| | Peel force between holding film B and thin-film structure [N/25 mm] | | 0.14 (P2') | 0.14 (P2') | 0.08 (P2') | Unmeasurable (P2') | 0 (P2') | 0 (P2') | — |
| Thickness of thin-film structure | | | approx 1 µm | approx 1 µm | approx 1 µm | approx 1 µm | approx 1 µm | approx 1 µm | approx 1 µm |
| P1-P2 | | | 0.10 | 0.05 | 0.14 | — | 0.19 | 0.19 | 0 |
| P1'-P2' | | | 0.09 | 0.08 | 0.14 | — | 0.22 | 0.22 | — |
| P1'/P1 | | | 0.96 | 1.16 | 1.16 | 1.16 | 1.11 | 1.11 | — |
| P2'/P2 | | | 1.00 | 1.00 | 1.60 | — | — | — | — |
| Evaluation of fracture of thin-film structure | Before leaving | First holding film side (P1 side) | A | A | A | C | A | A | — |
| | | Second holding film side (P2 side) | A | A | A | C | D | D | C (Holding film B) |
| | After leaving at 60° C. for 12 hours | First holding film side (P1' side) | A | A | B | C | A | A | — |
| | | Second holding film side (P2' side) | A | A | B | C | D | D | — |

As can be understood from Table 2, in the laminates of Examples 1 and 2 in which the thin-film structure had fine concave-convex structures at both surfaces and the peel force between one surface of the thin-film structure and the holding film laminated thereon and the peel force between the other surface of the thin-film structure and the holding film laminated thereon were different, the two holding films were each peeled stably, and fracture of the thin-film structure and its fine concave-convex structures was suppressed. In such a laminate, using the holding film with the smaller peel force as a support and the holding film with the greater peel force as a separation body, the holding film with the greater peel force may be stamped out with a stamping tooth profile, and further the holding film with the smaller peel force may be half-cut. By picking the stamped portion of the holding film with the greater peel force using a vacuum pick or the like, the thin-film structure can be picked up together with the holding film and conveyed to a substrate. This enables a process of high area efficiency and use efficiency.

The laminate of Comparative Example 1 degraded during storage, and as a result fracture of the thin-film structure was found. In the laminate of Comparative Example 2, fracture of the thin-film structure was found before and after storage.

In the laminates of Comparative Examples 3 and 4, the holding film B and the fine concave-convex structure of the thin-film structure were not joined. In the case where such laminates are distributed on the market, the holding film B comes off, and stain and fracture of the thin-film structure, in particular the fine concave-convex structure, are inevitable.

In the laminate of Comparative Example 5, the two holding films had the same peel force. Accordingly, when peeling the holding film B from the thin-film structure, a large part of the fine concave-convex structure came off together with the holding film, and the thin-film structure fractured.

The following experiment of forming an optical body on a substrate using a laminate was carried out. As the substrate, a COP substrate which is a hardly-adhesive substrate was used.

(Production of Laminate)

The same laminate (referred to as a "laminate I", the thickness of the part of the thin-film structure without any fine concave-convex structure: 200 nm) as in Example 1 was produced. Further, a laminate II (the thickness of the part of the thin-film structure without any fine concave-convex structure: 40 nm) and a laminate III (the thickness of the part of the thin-film structure without any fine concave-convex structure: 400 nm) were produced in the same way as Example 1, except that the pressure in the pressure joining by the roll laminator or the feed speed by the roll laminator in Example 1 was adjusted.

(Formation of Optical Body)

The holding film B was peeled from each produced laminate, to obtain a one-side peeled laminate. Meanwhile, a UV curable acrylic resin (LCR series produced by Toagosei Co., Ltd.) as an adhesive was applied onto a COP substrate. The one-side peeled laminate was then pressed against the adhesive applied onto the COP substrate in a state in which the surface from which the holding film B had been peeled faced the COP substrate. Following this, the pressed adhesive was irradiated with UV light, and thus cured. The press of the one-side peeled laminate was then released, and the one-side peeled laminate was released from the COP substrate at an angle of 90°, thereby peeling the part of the thin-film structure fixed by the cured adhesive from the one-side peeled laminate while separating the part fixed by the cured adhesive from the part of the thin-film structure other than the part fixed by the cured adhesive. An optical body (an optical body including the cured adhesive and the thin-film structure) was thus formed on the COP substrate.

In the examples using the respective laminates, the formation state of the optical body on the COP substrate was observed. As a result, in the examples using the laminates I and II, the whole thin-film structure fixed by the cured adhesive was appropriately transferred to the COP substrate side. In the example using the laminate III, on the other hand, part of the thin-film structure fixed by the cured adhesive remained on the one-side peeled laminate side without being transferred to the COP substrate side.

Moreover, in the examples using the respective laminates, the peel force at the peeling start when peeling the part of the thin-film structure fixed by the cured adhesive from the one-side peeled laminate while separating the part fixed by the cured adhesive from the part of the thin-film structure other than the part fixed by the cured adhesive was measured. FIG. 8 illustrates the results. As illustrated in FIG. 8, in the example using the laminate III, the peel force increased significantly at the peeling start (far exceeding 2 N/25 mm). This indicates that separability decreased as a result of the thin-film structure being subjected to strong resistance which occurred at the time of peeling.

Therefore, particularly in the case of forming an optical body on a hardly-adhesive substrate using the laminate according to the present disclosure, the part of the thin-film structure without any fine concave-convex structure is preferably thin (e.g. 200 nm or less).

INDUSTRIAL APPLICABILITY

It is thus possible to provide a laminate that includes a thin-film structure having a fine concave-convex structure at its surface, can be distributed on the market so that the thin-film structure is usable by a customer without staining or fracturing, and can be prevented from degradation even after storage. It is also possible to provide a method of forming an optical body with excellent antireflection performance on a substrate using the laminate. It is further possible to provide a camera module-mounted device capable of obtaining a captured image without color unevenness, ghosts, and the like.

REFERENCE SIGNS LIST 100 laminate
100' one-side peeled laminate
110 thin-film structure
110-1 first fine concave-convex structure
110-2 second fine concave-convex structure
120a first holding film
120a-1 third fine concave-convex structure
120b second holding film
120b-1 fourth fine concave-convex structure
121 base substrate
122 fine concave-convex layer
123, 123a, 123b inorganic membrane
124, 124a, 124b peel membrane
151 UV curable resin
160 roll laminator
170 substrate
171 adhesive
171' cured adhesive
200 optical body
300 camera module-mounted device
310 camera module
311 display plate
312 shading region
313 transparent region
314 adhesive layer
315 thin-film structure

The invention claimed is:

1. A laminate comprising:
a thin-film structure; and
holding films,
wherein a first holding film is laminated on one surface of the thin-film structure, and a second holding film is laminated on an other surface of the thin-film structure,
the thin-film structure has a first fine concave-convex structure at a surface in contact with the first holding film, and a second fine concave-convex structure at a surface in contact with the second holding film,
the first holding film has a third fine concave-convex structure at a surface in contact with the thin-film structure, the first holding film comprising at least one of polyethylene terephthalate or triacetyl cellulose,
the second holding film has a fourth fine concave-convex structure at a surface in contact with the thin-film structure, the second holding film comprising at least one of polyethylene terephthalate or triacetyl cellulose,
at least one of the first holding film or the second holding film includes an inorganic membrane and a peel membrane at a surface laminated on the thin-film structure,
a thickness of the thin-film structure is 10 μm or less,
$0<P1$, $0<P2$, and $P1 \neq P2$ in a 90° peeling test in accordance with JIS Z 0237:2009, where P1 is a peel force, expressed in N/25 mm, at an interface between the first holding film and the thin-film structure, and P2 is a peel force, expressed in N/25 mm, at an interface between the second holding film and the thin-film structure, and a difference between P1 and P2 is 0.3 N/25 mm or less.

2. The laminate according to claim 1, wherein the third fine concave-convex structure is an inverse structure of the first fine concave-convex structure, and the fourth fine concave-convex structure is an inverse structure of the second fine concave-convex structure.

3. The laminate according to claim 1, wherein a thickness of a part of the thin-film structure without any fine concave-convex structure is 200 nm or less.

4. The laminate according to claim 1, wherein a peel force at peeling start is 2 N/25 mm or less in a 90° peeling test that: is conducted after peeling the second holding film from the laminate to obtain a one-side peeled laminate, pressing the one-side peeled laminate against an adhesive containing a UV curable acrylic resin or a UV curable epoxy resin and applied onto a substrate whose surface is made of a cycloolefin copolymer, a cycloolefin polymer, or an epoxy acrylate copolymer in a state in which a surface from which the second holding film has been peeled faces the substrate, and irradiating the adhesive with UV light to cure the adhesive; and peels a part of the thin-film structure fixed by the cured adhesive from the one-side peeled laminate while separating the part fixed by the cured adhesive from a part of the thin-film structure other than the part fixed by the cured adhesive.

5. The laminate according to claim 1, wherein the thin-film structure is a single layer.

6. The laminate according to claim 1, wherein the first fine concave-convex structure, the second fine concave-convex structure, the third fine concave-convex structure, and the fourth fine concave-convex structure each have a concave-convex pattern having a pitch of less than or equal to visible light wavelength.

7. The laminate according to claim 1, wherein $P1'/P1 \leq 1.5$ and $P2'/P2 \leq 1.5$, where $P1'$ is a peel force, expressed in N/25 mm, at the interface between the first holding film and the thin-film structure after the laminate is left at 60° C. for 12 hours, and $P2'$ is a peel force, expressed in N/25 mm, at the interface between the second holding film and the thin-film structure after the laminate is left at 60° C. for 12 hours.

8. The laminate according to claim 1, wherein the first holding film and the second holding film differ in thickness.

* * * * *